(12) United States Patent
Hosey et al.

(10) Patent No.: US 8,983,720 B2
(45) Date of Patent: Mar. 17, 2015

(54) ENGINE RUNNING NOTICE AND AUTOMATIC SHUT-OFF

(71) Applicant: GM Global Technology Operations LLC, Detroit, MI (US)

(72) Inventors: Eric T. Hosey, Rochester, MI (US); Joshua M. Sine, Beverly Hills, MI (US); Kevin W. Owens, Sterling Heights, MI (US); Daniel C. McGarry, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/898,177

(22) Filed: May 20, 2013

(65) Prior Publication Data

US 2014/0343788 A1 Nov. 20, 2014

(51) Int. Cl.
*F02D 29/02* (2006.01)

(52) U.S. Cl.
CPC ..................................... *F02D 29/02* (2013.01)
USPC .......................................................... 701/36

(58) Field of Classification Search
USPC ....................... 701/36, 51, 99, 101, 102, 103; 180/65.28
See application file for complete search history.

(56) References Cited

U.S. PATENT DOCUMENTS

| | | | |
|---|---|---|---|
| 8,610,551 B2* | 12/2013 | Shimazu et al. | 340/441 |
| 2009/0312894 A1* | 12/2009 | Meltser et al. | 701/19 |
| 2012/0130604 A1* | 5/2012 | Kirshon et al. | 701/51 |
| 2013/0079952 A1* | 3/2013 | Fazi | 701/2 |
| 2013/0090784 A1* | 4/2013 | Hibbert | 701/2 |
| 2013/0110374 A1* | 5/2013 | Boesch | 701/102 |
| 2013/0110376 A1* | 5/2013 | Surnilla et al. | 701/103 |

FOREIGN PATENT DOCUMENTS

JP 2006161565 A * 6/2006

* cited by examiner

*Primary Examiner* — Mary Cheung
*Assistant Examiner* — Rodney Butler
(74) *Attorney, Agent, or Firm* — Ingrassia Fisher & Lorenz, P.C.

(57) ABSTRACT

A motor vehicle has an engine kill device that can automatically stop the engine. The vehicle has components for determining the engine may have been errantly left running, in which case the vehicle sends a notice to the user. The vehicle is capable of receiving a response from the user with instructions to leave the engine running. If no response is received, the vehicle can activate the engine kill device and stop the engine, or the vehicle can leave the engine running if a response is received from the user indicating the engine should remain running.

20 Claims, 3 Drawing Sheets

ENGINE RUNNING NOTICE AND AUTOMATIC SHUT-OFF

TECHNICAL FIELD

The technical field generally relates to motor vehicles with user notice systems, and more particularly relates to motor vehicles with notice systems for alerting a user that the motor vehicle engine has been left running, and where the motor vehicle can automatically shut off the engine.

BACKGROUND

A vehicle operator may unintentionally leave a motor vehicle engine running, which can waste fuel and can even contribute to an accumulation of exhaust gas if not properly ventilated, such as in some garages. However, on other occasions, a vehicle operator may want a vehicle to remain running, even when the operator is not actively driving the vehicle. For example, if a parent leaves a child or pet in a parked vehicle while briefly entering a store, that parent may want to leave the vehicle running so the air conditioning controls the temperature in the vehicle.

Many modern vehicles have several automatic functions to improve the safety, convenience, and general operations of a vehicle. However, it is not always clear if some functions should be performed, such as stopping a running engine when the vehicle is not in active use. Therefore, there is a need for a vehicle that can notify a user that an engine may have been errantly left running, and allow the user to instruct the vehicle whether to stop the engine or leave it running.

SUMMARY

In accordance with one embodiment, a motor vehicle has an engine kill device that can automatically stop the engine. The vehicle has means for determining if the engine has been errantly left running, and then notifying a user. The vehicle also has means for receiving a response from the user with instructions to leave the engine running. A controller is coupled to the engine kill device, and the controller activates the engine kill device if the user does not respond to the engine running notification within a set response time.

In some embodiments, the vehicle has a plurality of sensors, including a sensor that detects whether the engine is running or not. The controller is coupled to the plurality of sensors, and evaluates the signals from the sensors to determine if the engine may have been errantly left on. Notice to the user may be provided with a notice device, which is coupled to the vehicle, and the user can respond to the notice using a response link.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

A vehicle can be configured to determine that the engine may have been errantly left running, and to notify a driver or user of that condition. The vehicle includes a device for the user to respond to the notice, and the vehicle can then take appropriate actions based on the user's response. If a user receives a notice that the vehicle engine is running, the user can respond and instruct the automated systems in the vehicle that the engine should remain running, or the user could allow the vehicle to automatically turn the engine off. The following description details some possible components and techniques that may be used for this purpose.

Figure 1:
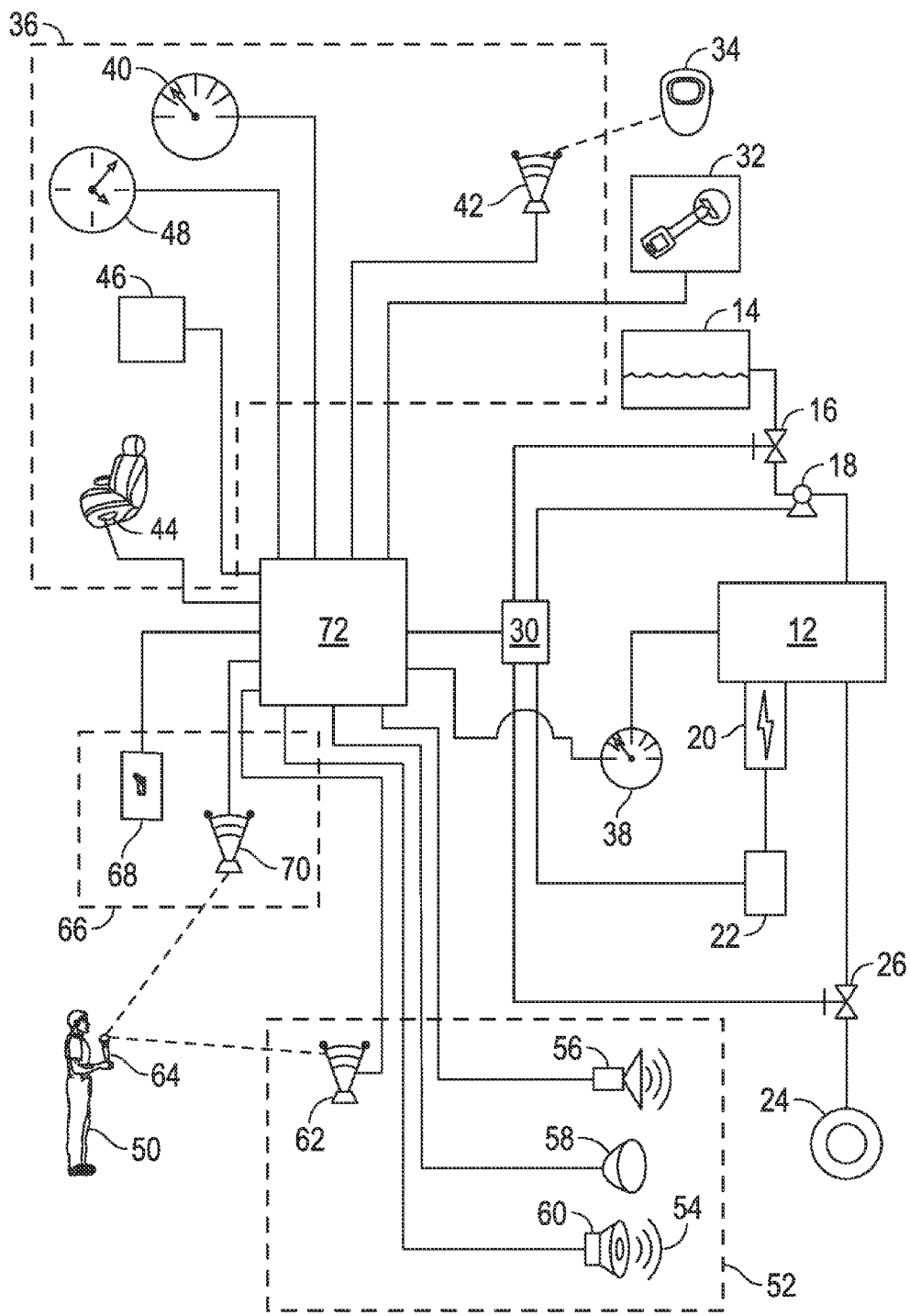
FIG. 1 is vehicle schematic diagram showing various components of a vehicle in accordance with one embodiment, wherein dotted lines are used to show wireless communications.

FIG. 1 is a schematic diagram of a vehicle 10 including an engine 12. The engine 12 may be an internal combustion engine, which ignites a mixture of fuel and air within a cylinder to provide a motive force. The fuel may be stored in a fuel tank 14, and a fuel valve 16 may be installed in the line from the fuel tank 14 to the engine 12. In some embodiments, a pump 18 may be used to pump the fuel to the engine 12. Pressure from the pump may be used to directly inject the fuel into the cylinders of the engine 12, or the fuel may be aspirated and mixed with air in a carburetor before being drawn into the cylinders. The pump 18 may be a fuel pump that simply delivers the fuel to a carburetor, or the pump 18 may be an injector pump for injecting the fuel into the cylinders, and there may be more than one pump 18 in use for transporting fuel in the vehicle 10. The fuel valve 16, if present, can be upstream or downstream from the pump 18 in the line from the fuel tank 14 to the engine 12. Other methods may be used for transferring the fuel from the fuel tank 14 to the engine 12.

A spark plug 20 may be used to ignite the fuel and air mixture, and activation of the spark plug 20 may be controlled by an ignition module 22. The ignition module 22 can be an electronic ignition module that electronically controls the timing and activation of the spark plug 20, but the ignition module 22 could also be a distributor or other device used to control the timing for the spark plug 20. In some embodiments, the engine 12 may be a diesel engine or other engine that does not use a spark plug 20 to ignite the fuel, and therefore no spark plug 20 is present. The spark plug 20, if present, is timed such that a spark is generated when needed to ignite the fuel/air mixture in a cylinder of the engine 12. In many embodiments, the engine 12 has a plurality of spark plugs 20, and often there are one or more spark plugs per cylinder in the engine 12.

An air intake 24 draws air from the atmosphere and directs it to the cylinder for combustion. An air filter is often used with the air intake 24, and an air valve 26 may be used to control the air flow to the cylinders in the engine 12. The air valve 26 may be a throttle valve, where a driver controls air flow to the engine 12 to control power, but the air valve 26 could also be a simple cut-off valve to stop air flow. Combustion in an internal combustion engine 12 requires three primary components; oxygen which is provided by the air, fuel, and a source of ignition, such as a spark. Without air, fuel, or an ignition source, the internal combustion engine 12 will not run. The ignition source for some engines 12, such as diesel engines, is provided by compression, so a spark plug 20 is not always required for ignition. Oxidizing agents other than oxygen are also possible, but most engines use the oxygen in the air for combustion.

An engine kill device 30 is coupled to the engine 12, and is configured to stop the engine under certain conditions, as described below. The kill device 30 may utilize many different techniques to stop the engine, but interruption of either fuel flow, air flow, or spark are typically employed. The design and manner of operation of the engine 12 are considered when determining how the kill device 30 stops the engine 12. Example embodiments include coupling the kill device 30 to the fuel valve 16 or the pump 18 that provides fuel to the engine 12, and closing the fuel valve 16 or stopping the pump 18 to stop the engine 12. Alternatively, the kill device 30 may be coupled to the ignition module 22 to stop the spark and thereby stop the engine 12. In another embodiment, the kill device 30 may be coupled to the air valve 26, and configured to close the air valve 26 to stop air flow and thereby stop the engine 12. The kill device 30 may be indirectly coupled to the engine 12, because the kill device 30 may be directly coupled to another system that supports the engine operations. The kill device 30 may use other methods to stop the engine 12, such as locking or breaking the flywheel, but interruption of the fuel flow, air flow, or spark are the most common methods.

The vehicle 10 includes a run switch 32, which is a switch used to turn the engine 12 on. The run switch 32 may also turn on other features and aspects of the vehicle 10, and the various features and aspects may vary from one vehicle 10 to the next. In some embodiments, the run switch 32 turns on the radio, and in other embodiments the run switch 32 activates local power outlets, such as the type used for cigarette lighters. In many vehicles 10, the run switch 32 is activated by turning a key in the ignition, but in other embodiments the run switch 32 may be activated by a key fob 34. The key fob 34 uses electromagnetic radiation to communicate with the vehicle 10, such as radio waves or the communication standard known by the trademark BLUETOOTH. After the run switch 32 is activated, the engine 12 can be started with a separate action, such as turning the key in the ignition to the "start" position or pressing an engine start button in the vehicle 10. The kill device 30 works while the run switch 32 is activated, so the kill device 30 will stop the engine 12 while the key in the ignition is in the run position, or while the key fob 34 is near the vehicle. The run switch 32 allows the engine 12 to run, but does not require the engine 12 to be running, such as when a vehicle 10 is turned on but before the vehicle engine 12 is started.

The vehicle 10 includes a plurality of sensors 36 for detecting various parameters regarding the vehicle 10. Each of the sensors 36 send a signal indicating the status of one or more vehicle components. One of the plurality of sensors 36 may be an engine running sensor 38, which detects if the engine 12 is running or not. Many different measurements can be used to detect if the engine 12 is running, including but not limited to a revolution per minute (RPM) reading for the engine 12 or a transmission attached thereto, a fuel flow meter that detects fuel flow to the engine 12, an air flow meter that detects air flow to the engine, an exhaust sensor that detects flow or various combustion products, or any other component which indicates the engine 12 is running. The status of the engine 12 as either running or not running may be saved in a memory (i.e., a status buffer) for reference by various vehicle components.

The vehicle 10 may also include a speed sensor 40, which measures the speed at which the vehicle 10 is traveling. The speed sensor 40 may be the speedometer, which may be coupled to the drive shaft, an axle, or some other component of the vehicle 10 which only moves when the vehicle 10 moves. The speed sensor 40 may also be a global positioning system (GPS) that tracks the location of the vehicle 10 using triangulation with satellites. The GPS can include a timer, so changes in position can be tracked over time to provide the vehicle's speed. The speed sensor 40 can show if the vehicle 10 is parked, or not moving, because the speed will be zero. However, minor inaccuracies could lead to a speed sensor 40 showing a speed slightly above zero, even when the vehicle 10 is not moving, so a lower limit may be established that represents a speed of zero. For example, a reading of less than one kilometer per hour could be interpreted to mean a speed of zero, especially if the speed of less than one kilometer per hour lasted for an extended period. Other lower limits are also possible, and these lower limits could be coupled with a timer, such that a reading of less than a lower limit for more than some time period was interpreted as a speed of zero.

A key fob sensor 42 can detect the presence of the key fob 34, and in some embodiments the key fob sensor 42 can detect if the key fob 34 is (1) within a cabin of the vehicle 10, (2) within range of the key fob sensor 42 but outside of the vehicle cabin, or (3) out of the range of the key fob sensor 42. Of course, the key fob sensor 42 is only functional in vehicles 10 with a key fob 34. The key fob sensor 42 may be a receiver that receives radio waves, or other electromagnetic radiation, and many different protocols can be used. In one embodiment, the key fob 34 and key fob sensor 42 use BLUETOOTH for communications. In many embodiments, the key fob 34 and key fob sensor 42 are encrypted for security purposes.

An occupant sensor 44 can detect if a person is present in the vehicle 10. In some embodiments, the occupant sensor 44 is a weigh cell (or a load cell) located in one or more seats. When the weigh cell detects sufficient weight, it registers as a person present in the vehicle 10. The weigh cell may be located in the driver's seat, or the front seats of a vehicle 10, or every seat in a vehicle, as desired. The driver's seat is occupied when the vehicle 10 is used by a single person, and the front passenger's seat is usually the next seat to be occupied, so positioning a weigh cell in those seats gives satisfactory results for a limited number of weigh cells. Other metrics may also be used as an occupant sensor 44, such as detecting when a seat belt buckle has been secured, or the use of a heat sensor to detect body heat. Other possible techniques include radar or laser object detection, or even microphones that listen for a heartbeat. Many different devices and techniques may be used for the occupant sensor 44. The occupant sensor 44 can also be used for additional information, such as the time when a person left a vehicle 10, as indicated by the occupant sensor 44 changing from showing the presence of an occupant to not showing the presence an occupant.

The occupant sensor 44 may be developed to identify different types of individuals as well. For example, a microphone may be able to differentiate a baby's heartbeat from an adult's, based on heartbeat speed. Imaging techniques, such as radar or laser imaging, may also be able to differentiate a baby from an older person based on size. A facial recognition system could be used as an occupant sensor 44, and the different features of a baby's face could be distinguished from an adult face. An occupant sensor 44 that can differentiate between a baby or young child and an older person may have special value, as described more fully below. Similar methods could also be used to identify a pet or animal other than a human. If the vehicle 10 was not equipped with a sensor 44 capable of determining an occupant was a child, implicit, express, or absolute directions from the user 50 may be required to turn off the engine 12.

A vehicle 10 may also include one or more carbon monoxide (CO) sensors 46 in some embodiments. The CO sensor 46 can be positioned to sense CO in the vehicle cabin, but it is also possible for the CO sensor 46 to be positioned in the exhaust for engine performance issues, in a vehicle trunk, or in other locations. CO is a poisonous gas that is often present in exhaust, so detection of CO can indicate exhaust fumes are present at dangerous levels.

A vehicle 10 may include a timer 48, which may have several different uses. The timer 48 can be digital or analog, and there may be several different timers 48 for different purposes, or one timer 48 used for several different purposes.

The vehicle 10 includes a notice device 52 to send a notice 54 intended for the user 50. The notice 54 is transmitted to notify the user 50 that the engine 12 may have been errantly (i.e., unintentionally) left running. The notice device 52 may be a local notice device, such as a horn 56, one or more lights 58, or a speaker 60. The speaker 60 could be the speakers used by the radio and/or stereo system in the vehicle 10, or a separate speaker 60 could be provided. The speaker 60 could also be part of the human interaction system, which may use the radio or stereo speaker. The speaker 60 may be positioned within the vehicle cabin, and the horn 56 is typically positioned outside of the vehicle cabin. The light 58 can be the driving lights, or it could be a cabin light, or a separate light, or any combination of the above. The local notice 54 can be a short honk of the horn (referred to as a horn chirp), a flash of the lights, or a sound or words emitted from the speaker 60. The local notice 54 may use a unique sequence or combination of signals, such as two short horn chips, three short light flashes, etc., so the user 50 can distinguish the notice 54 from other signals. As such, the notice 54 may not expressly state the engine 12 may have been errantly left running, but instead otherwise indicate that the engine 12 may have been errantly left running. In other embodiments, the notice 54 expressly states that the engine 12 may have been errantly left running.

The notice device 52 may also include a transmitter 62 for sending the notice 54 to a remote user 50. The transmitter 62 can send a signal to a remote user 50 who has a communication device 64 capable of receiving those signals, such as a telephone, pager, computing device, or a radio. In some embodiments, the communication device 64 is also capable of transmitting a response. However, in other embodiments, separate devices may be used for receiving the notice 54 and for transmitting a response. Different types of remote notices 54 can be used, such as a short message service (SMS) message, or a push notification where an automated system sends notifications to a user 50. The remote notice 54 may be a text message, a phone call, an e-mail message, a Twitter status, a page, or other methods capable of informing the user 50 that the vehicle engine 12 may have been errantly left on.

A driver or other user 50 of the vehicle 10 may use a response link 66 to communicate with the automated systems of the vehicle 10. The response link 66 may include a local acknowledgement 68, such as a push button or a switch. The local acknowledgement 68 could also be part of a human interaction system, such as the system associated with the trademark ONSTAR, where the user 50 is able to talk to the human interaction system and provide instructions. Human interaction systems often include voice recognition systems such that specific words and/or commands can be understood and acted on by the system. The local acknowledgement 68 could also be part of the key fob 34, so the user 50 could press a special button or an existing button to respond to a notice 54 from the vehicle 10. An engine start button could be the local acknowledgement in properly equipped vehicles 10. The local acknowledgement 68 is some device or system that is part of the vehicle 10, or connected to the vehicle 10, so a user 50 can activate the local acknowledgement 68 when the user 50 is physically present with the vehicle 10. If the response link 66 uses a simple switch, a response from the user 50 could be interpreted to mean the engine 12 should remain running, while no response could be interpreted to mean the engine 12 should be shut off. In other embodiments, the response link 66 could include a response with instructions to turn off the engine 12.

The response link 66 may also include a receiver 70 capable of receiving messages from a remote user 50. The receiver 70 may be capable of accepting one or more types of communication, such as telephone calls, text messages, pages, radio signals, or other forms of communications. The receiver 70 could be coupled to a human interaction system or other system with voice recognition capabilities, so the user 50 could call the receiver 70 and provide a verbal response and instructions. In other embodiments, the receiver 70 is not coupled to a human interaction system. The notice 54 could include instructions, such as "text 'on' to leave the engine 12 on, or text 'off' to turn the engine off", and these limited instructions could be interpreted without a voice recognition system. In some embodiments, and response received by the receiver 70 could be interpreted as instructions to leave the engine 12 running, so the user 50 would not respond at all to have the engine 12 stopped.

The vehicle 10 also includes a controller 72, which includes any combination of hardware and software configured to determine when the engine 12 may have been errantly left running. The controller 72 can include any type of processor or multiple processors, integrated circuits such as a microprocessor, or any suitable number of integrated circuit devices and/or circuitry working in cooperation to accomplish the tasks of the controller 72. The controller 72 executes one or more programs that may be stored within memory. The controller 72 may include, or have access to, any type of memory, including but not limited to random access memory (RAM), read only memory (ROM), erasable programmable read only memory (EPROM), electrically erasable programmable read only memory (EEPROM), and non-volatile random access memory (NVRAM). The memory can store any information needed for the operation of the controller 72, as described herein. The controller 72 may be part of other systems on the vehicle 10, or it may be a dedicated device.

The controller 72 is coupled to the sensors 36, the engine kill device 30, the timer 48, the notice device 52, and the response link 66, in whichever forms present. The coupling of the controller 72 to the other components may be direct or indirect, as long as information can be exchanged. The controller 72 is configured to evaluate the input or signals from the plurality of sensors 36 and determine if the engine 12 may have been errantly left running by comparing the signals to predetermined criteria. The controller 72 is also configured to have the notice 54 issued and receive a response from the user 50, and to either stop the engine 12 with the kill device 30 or leave the engine 12 running, as appropriate.

Figure 2:
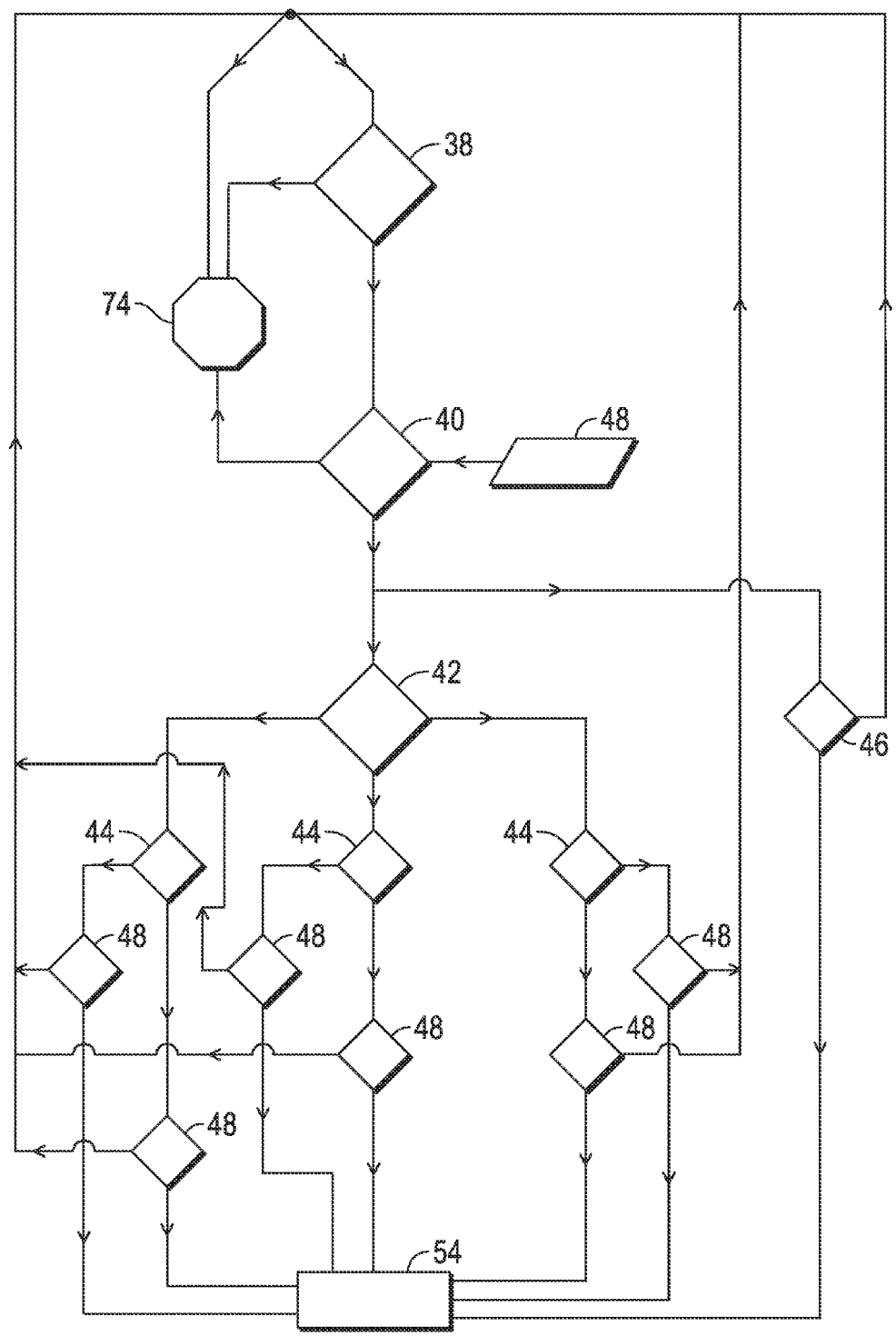
FIG. 2 is a schematic diagram of one embodiment of the logic used to determine if the vehicle engine may have been errantly left running.

The schematic shown in FIG. 2 represents one embodiment for the operational logic used by the controller 72 to determine if the engine 12 may have been errantly left running. The diamond shaped boxes represent sensors 36, which can have two or more outputs, as described above. The logic for each output is indicated by a corner point of the diamond. The octagon represents a stop action 74. There are several representations of the occupant sensor 44 and the timer 48, but these representations are not intended to indicate separate occupant sensors 44 or timers 48. The multiple representations are intended to illustrate the logic under different scenarios, where the same sensor 36 may be shown separately for different logic flow paths. After the controller 72 determines the engine 12 may have been errantly left running, the controller 72 has a notice 54 issued for the user, and the controller 72 is configured to either stop the engine 12 or leave it running depending on any response which may or may not be received from the user 50.

Beginning near the top of FIG. 2, the controller 72 receives a signal from the engine running sensor 38 and verifies the engine 12 is running. The controller 72 also receives a signal from the speed sensor 40 and the timer 48 to determine the vehicle 10 has not moved for a set (e.g. predetermined) notification time. The set notification time may vary from one scenario to the next, and the controller 72 is configured to use the set notification time specifically established for each separate scenario evaluated. In this embodiment, the controller 72 determines the engine is running and the vehicle 10 has not moved from some set period of time for every scenario. The controller 72 will not notify the user 50 that the engine 12 may have been errantly left running if the engine 12 is not running, or if the vehicle 10 is moving, or has recently moved.

In an example scenario, the controller 72 receives a signal from the key fob sensor 42 which indicates the key fob 34 is in the vehicle 10. The three outputs from the fob sensor 42 indicate either (1) the key fob 34 is inside the vehicle cabin, or (2) the key fob 34 is within range of the key fob sensor 42 but outside of the cabin, or (3) the key fob 34 is out of range of the key fob sensor 42. The controller 72 also receives a signal from the occupant sensor 44 which indicates either a person is in the cabin of the vehicle 10, or no one is in the vehicle cabin. The controller 72 continues to receive the same signals from the fob sensor 42 and the occupant sensor 44 for a set notification time, as indicated by the diamond representing the timer 48. If the sensor signals change before the set notification time, the process is re-set and starts over. However, if the sensor signals do not change before the set notification time, the controller 72 advances and has a notice 54 issued. The set notification time for issuing a notice 54 may be different for the scenario where the occupant sensor 44 indicates a person is inside the vehicle 10 and scenario with no one inside the vehicle 10.

In another scenario set, the controller 72 receives a signal from the fob sensor 42 indicating the key fob 34 is outside of the vehicle 10, but within range of the vehicle 10. The occupant sensor 44 indicates a person is either inside the vehicle cabin or not, and the controller 72 has a notice 54 issued after the set notification time if the sensor signals do not change. In yet another scenario set, the controller 72 receives a signal from the fob sensor 42 indicating the key fob 34 is outside of the vehicle 10, and out of range of the vehicle 10. The occupant sensor 44 indicates a person is either inside the vehicle cabin or not for a set notification time. After the set notification time expires with no change in the sensor signals, the controller 72 has a notice 54 issued. As above, the set notification time may vary for each possible scenario, or it may be the same for some or all of the different scenarios.

In another scenario, the CO sensor 46 indicates there is a high level of CO in the vehicle 10. The engine 12 is running, and the vehicle 10 has not moved for some set notification time. The controller 72 may issue a notice 54 as soon as the high CO levels are detected, and the notice 54 could indicate the CO level was high. Alternatively, the controller 72 could activate the engine kill device 30 at the same time as the notice 54 is issued, regardless of any response from the user 50, so the user 50 would have to re-start the engine 12 when a high CO level was detected. If a condition changes before the set notification time expires for any of the scenarios, the timer is restarted and the process begins again.

The notice 54 may be a local notice for embodiments where the key fob sensor 42 indicates the key fob 34 is within range of the vehicle 10, and is either inside or outside of the cabin. The notice 54 may be remotely issued by the transmitter 62 when the key fob sensor 42 indicates the key fob 34 is out of range of the vehicle. The notice 54 may be issued both locally and remotely for any scenario as well, if desired. For example, a local and remote notice 54 may be useful when the key fob sensor 42 indicates the key fob 34 is outside of the vehicle 10, but in range, because the user 12 may or may not be close enough to detect the local notice 54.

Figure 3:
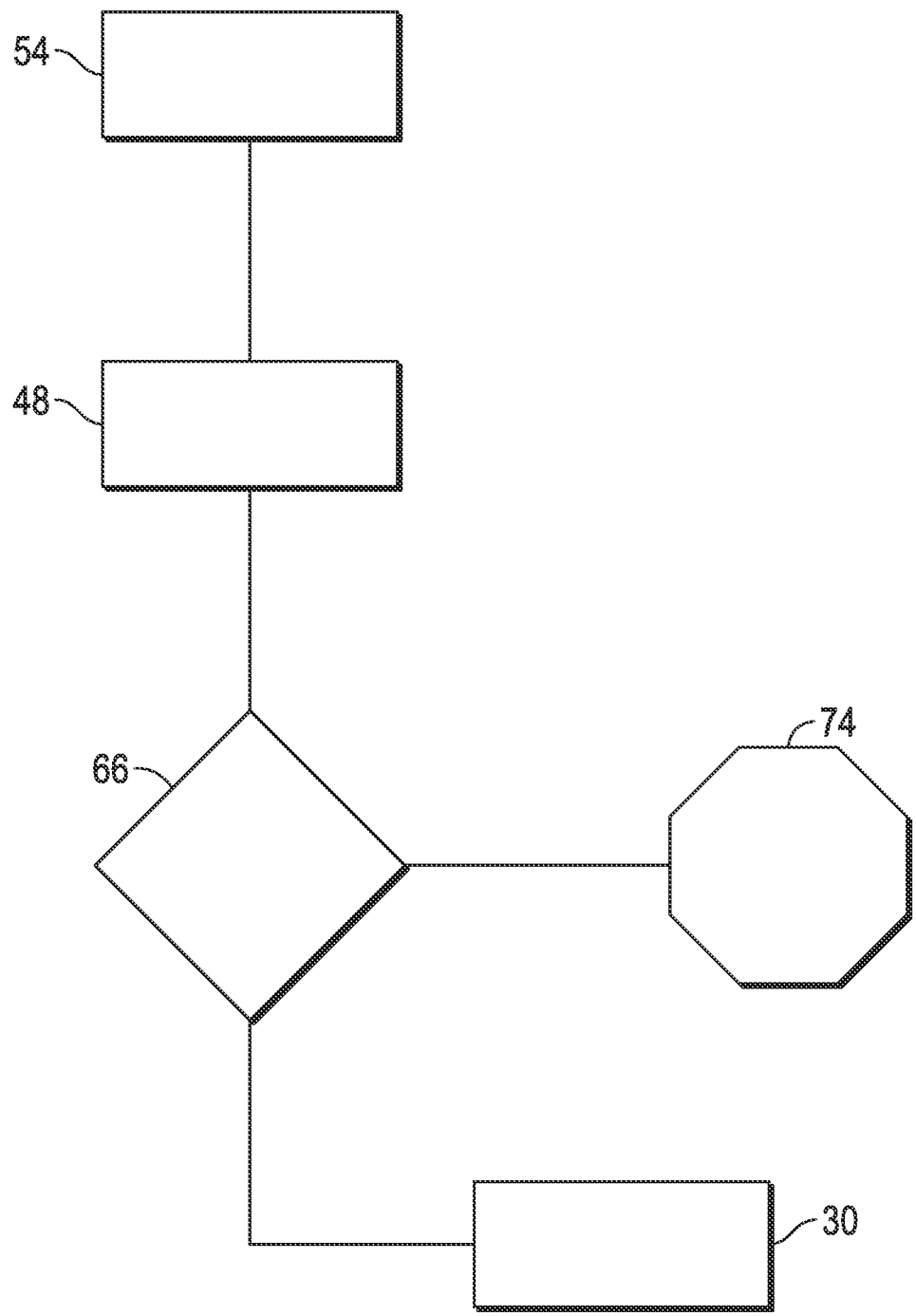
FIG. 3 is a schematic diagram of one embodiment of the logic used to determine if the vehicle engine should be turned off, or left running.

After the notice 54 has been transmitted, the controller 72 waits for a set response time, as illustrated in FIG. 3. As with the set notification time, the set response time may vary for each scenario, or it may be the same for some or all of the scenarios. The user 50 is able to respond to the notice 54 using the response link 66. If the controller 72 receives a response from the user 50 indicating the engine 12 should be left running, the controller 72 will leave the engine 12 running. If the controller 72 does not receive a response from the user 50 within a set response time, the controller 72 with activate the kill device 30 and stop the engine 12. The response link 66 may or may not have a method for the user 50 to actively indicate the engine 12 should be stopped. In embodiments where the response link 66 is only able to indicate the engine 12 should be left running, the controller 72 will have to wait for the set response time to expire before stopping the engine 12. In other embodiments, the response link 66 may indicate the engine 12 should be stopped, in which case the controller 72 activates the kill device 30 when the response is received.

The controller 72 may or may not send another notice 54 for the same conditions as the first, and the set notification time for any follow-up notice may be different from the original set notification time. If the response link 66 is activated to indicate the engine 12 should remain running, the controller 72 may advance to a stop action 74, but in other embodiments the controller 72 may continue evaluating sensor signals to determine if a follow-up notice 54 should be issued. For example, consider a case in which the controller 72 issued a notice 54 because (1) the engine 12 had been running, (2) the vehicle 10 had not moved, (3) there were no vehicle occupants, and (4) the key fob 34 was out of range, and the user 50 activated the response link 66 indicating the engine 12 should remain running. In this example, the controller 72 may be configured to send a follow-up notice 54 for the same conditions only after a much longer set notification time has expired, so the follow-up notice 54 has a different set notification time than the first notice 54. Alternatively, the controller 72 may be configured not to send any follow-up notice for that same scenario. It is also possible for the controller 72 to issue follow-up notices 54 for some scenarios, but not for others. For example, a follow-up notice 54 may be issued when CO is detected in the cabin, but not for other scenarios.

In a non-limiting exemplary embodiment, the sensors 36 indicate the engine 12 is running, the vehicle 10 has not moved, the key fob 34 is in the vehicle cabin, there are no occupants in the vehicle cabin, and the sensors 36 have not changed for a set notification time of fifteen minutes. The controller 72 has a notice 54 issued, which includes two horn chirps, two driving light flashes, and a text message sent to the user's communication device 64 that says "vehicle engine is running. Respond if the engine should remain running." In this example, the user's communication device 64 is a cell phone. No response is received from the user 50 within a set response time of three minutes, so the controller 72 activates the kill device 30 and turns off the engine 12.

Different or additional logic may be used if sensors 36 are present which indicate a baby or pet is inside the cabin of the vehicle 10. A baby or pet is not able to respond to a notice 54, so different parameters may be appropriate. Alternatively, there may be sensors 36 which indicate a flat tire, or the emergency flashers are running, or an air bag has deployed, or other situations. Different logic could be implemented as appropriate for such scenarios.

In some embodiments, the controller 72 has a cancel option, where a user 50 can deactivate the notice 54 and engine killing function of the controller 72. Some users 50 may not like the system, or the user 50 may decide they want the system inactive for some activity or period of time. In different embodiments, the cancel option could be easily initiated by the user 50, or a dealer may be required to initiate the cancel option for the user 50. The cancel option may also be selectively available, so the controller 72 would not issue notices 54 for some scenarios, but the controller 72 would issue notices for others. For example, the cancel option may cancel all notices 54 except those based on detection of CO in the vehicle cabin.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
   an engine;
   a plurality of sensors;
   an engine kill device coupled to the engine, wherein the engine kill device is configured to stop the engine;
   a notice device;
   a response link; and
   a controller coupled to the engine kill device, the plurality of sensors, the notice device, and the response link, wherein the controller is configured to evaluate signals from the plurality of sensors and issue a notice when the signals from the plurality of sensors meet predetermined criteria, and wherein the controller is further configured to activate the engine kill device if the response link is not activated after the notice is issued, and wherein the controller is configured to terminate monitoring to determine if the engine has been errantly left running upon activation of the response link indicating the engine should remain running.

2. The vehicle of claim 1 further comprising a timer coupled to the controller, wherein the controller is further configured to activate the engine kill switch if the response link is not activated within a set response time after the notice is issued.

3. The vehicle of claim 1 wherein the notice device further comprises a local notice device and a transmitter, and wherein the controller is configured to evaluate the signals received from the plurality of sensors to select the notice device used for issuing the notice.

4. The vehicle of claim 1 wherein the response link further comprises a local acknowledgement directly coupled to the vehicle, and a receiver configured to receive a signal from a remote user.

5. The vehicle of claim 1 wherein the plurality of sensors comprises:
   an engine running sensor that detects when the engine is running; and
   a speed sensor that detects the speed of the vehicle;
   wherein the controller is configured to require a positive signal from the engine running sensor and a speed sensor reading of less than a lower limit to issue the notice.

6. The vehicle of claim 5 wherein the plurality of sensors further comprise:
   a key fob sensor that detects a key fob, wherein the key fob sensor detects if the key fob is within the vehicle, outside of the vehicle but within a preset range of the vehicle, or outside of the preset range of the vehicle; and
   an occupant sensor that detects if a seat in the vehicle is occupied.

7. The vehicle of claim 2 wherein the controller is further configured to require the signals from the plurality of sensors remain constant for a set notification time prior to issuing the notice.

8. The vehicle of claim 3 wherein the local notice device comprises at least one of a horn, a light, and a speaker.

9. The vehicle of claim 3 wherein the transmitter is configured to transmit the notice using at least one of a text message, a phone call, a page, or an e-mail.

10. A vehicle comprising:
    an engine;
    an engine kill device capable of turning the engine off, wherein the kill device is coupled to the engine;
    means for determining if the engine has been errantly left running;
    means for issuing a notice that the engine has been left running;
    means for receiving a response from a user; and
    a controller coupled to the engine kill device, wherein the controller is configured to activate the engine kill device if no response is received from the user within a set response time after the notice was issued, and wherein the controller is configured to terminate monitoring to determine if the engine has been errantly left running upon receipt of the response indicating the engine should remain running.

11. The vehicle of claim 10 wherein the means for determining if the engine has been errantly left running comprises a plurality of sensors coupled to the controller, wherein the plurality of sensors comprises at least an engine running sensor and a speed sensor, and wherein a positive signal from the engine running sensor and a reading of less than a lower limit from the speed sensor is required to determine the engine may have been errantly left running.

12. The vehicle of claim 10 wherein the means for receiving a response from the user comprises a response link, and wherein the response link comprises a local acknowledgement and a receiver.

13. The vehicle of claim 10 wherein the means for issuing a notice to the user comprises at least one of a horn, a light, a radio, or a transmitter.

14. A method of automatically turning a vehicle engine off, the method comprising:
    receiving signals from a plurality of sensors at a controller, and wherein the controller evaluates the signals to determine if the engine may have been errantly left running;

sending a notice indicating the engine may have been errantly left running;

turning the engine off if no response is received within a set response time after the notice was sent; and providing a response link configured for a human to indicate the engine should remain running, wherein activation of the response link to indicate the engine should remain running advances the controller to a stop action that terminates monitoring to determine if the engine may have been errantly left running.

15. The method of claim 14 wherein turning the engine off further comprises turning the engine off if a user provides instructions to turn the engine off within the set response time.

16. The method of claim 14 wherein determining the engine may have been errantly left running further comprises determining that the engine is running, and determining that a vehicle speed is less than a lower limit.

17. The method of claim 14 wherein determining the engine may have been errantly left running further comprises receiving, at the controller, signals from a plurality of sensors, and wherein the controller evaluates the signals to determine if the engine may have been errantly left running.

18. The method of claim 14 wherein sending the notice further comprises transmitting at least one of a short message service (SMS) or a push notification.

19. The method of claim 14 wherein sending the notice further comprises at least one of honking a horn, flashing a light, or activating a speaker.

20. The method of claim 14 wherein providing the response link comprises providing the response link comprising a local acknowledgement and a receiver.

* * * * *